(12) United States Patent
Hawkins

(10) Patent No.: US 11,087,593 B2
(45) Date of Patent: *Aug. 10, 2021

(54) METHOD OF GAMING, A GAME CONTROLLER, AND A GAMING SYSTEM

(71) Applicant: Aristocrat Technologies Australia Pty Limited, North Ryde (AU)

(72) Inventor: Ryan Hawkins, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 279 days.

This patent is subject to a terminal disclaimer.

(21) Appl. No.: 14/743,316

(22) Filed: Jun. 18, 2015

(65) Prior Publication Data

US 2015/0356827 A1    Dec. 10, 2015

Related U.S. Application Data

(63) Continuation of application No. 13/798,948, filed on Mar. 13, 2013, now abandoned, which is a continuation of application No. 12/719,478, filed on Mar. 8, 2010, now Pat. No. 8,419,530.

(30) Foreign Application Priority Data

Mar. 10, 2009    (AU) .............................. 2009901016

(51) Int. Cl.
*G07F 17/32* (2006.01)
*G07F 17/34* (2006.01)
*A63F 13/00* (2014.01)

(52) U.S. Cl.
CPC .......... *G07F 17/3258* (2013.01); *A63F 13/00* (2013.01); *G07F 17/32* (2013.01); *G07F 17/3223* (2013.01); *G07F 17/34* (2013.01)

(58) Field of Classification Search
CPC .. G07F 17/3258; G07F 17/32; G07F 17/3223; G07F 17/34; A63F 13/00
See application file for complete search history.

(56) References Cited

U.S. PATENT DOCUMENTS

| 6,012,982 A | 1/2000 | Piechowiak et al. | |
|---|---|---|---|
| 6,093,101 A * | 7/2000 | Mourad | G07F 17/32 463/13 |
| 6,146,271 A * | 11/2000 | Kadlic | A63F 1/00 273/292 |

(Continued)

FOREIGN PATENT DOCUMENTS

| AU | 2008249533 | 12/2008 |
|---|---|---|
| WO | 2008057356 | 5/2008 |

OTHER PUBLICATIONS

United States Patent and Trademark Office, "Notice of Allowance," mailed in connection with U.S. Appl. No. 12/719,478, dated Feb. 5, 2013, 23 pages.

(Continued)

*Primary Examiner* — Werner G Garner
(74) *Attorney, Agent, or Firm* — Armstrong Teasdale LLP

(57) ABSTRACT

An example method of gaming includes: conducting a progressive jackpot including a prize defined by a plurality of digits; and incrementing the progressive jackpot by incrementing a digit of said plurality of digits of the prize in response to a trigger event corresponding to the digit occurring.

15 Claims, 7 Drawing Sheets

(56) References Cited

U.S. PATENT DOCUMENTS

| | | | |
|---|---|---|---|
| 7,785,183 B1* | 8/2010 | Stockham | G07F 17/34 463/13 |
| 8,419,530 B2 | 4/2013 | Hawkins | |
| 2001/0031659 A1* | 10/2001 | Perrie | A63F 3/00075 463/18 |
| 2002/0043759 A1* | 4/2002 | Vancura | A63F 9/183 273/139 |
| 2003/0036422 A1 | 2/2003 | Baerlocher et al. | |
| 2004/0204226 A1* | 10/2004 | Foster | G07F 17/3244 463/20 |
| 2005/0149773 A1* | 7/2005 | Kevan | G06F 1/3203 713/320 |
| 2006/0009278 A1* | 1/2006 | Vancura | G07F 17/3244 463/25 |
| 2006/0025210 A1 | 2/2006 | Johnson | |
| 2006/0116188 A1 | 6/2006 | Blankstein | |
| 2006/0142079 A1 | 6/2006 | Ikehara et al. | |
| 2006/0205491 A1 | 9/2006 | Daley | |
| 2007/0167217 A1* | 7/2007 | Kaminkow | G07F 17/32 463/20 |
| 2008/0032782 A1 | 2/2008 | Boesen et al. | |
| 2008/0113779 A1 | 5/2008 | Cregan | |
| 2008/0248865 A1* | 10/2008 | Tedesco | G07F 17/3248 463/25 |
| 2009/0305765 A1* | 12/2009 | Walker | G07F 17/3223 463/20 |
| 2010/0234098 A1 | 9/2010 | Hawkins | |
| 2013/0190079 A1 | 7/2013 | Hawkins | |

OTHER PUBLICATIONS

United States Patent and Trademark Office, "Non-Final Office Action," mailed in connection with U.S. Appl. No. 12/719,478, dated Dec. 12, 2011, 16 pages.

United States Patent and Trademark Office, "Non-Final Office Action," mailed in connection with U.S. Appl. No. 13/798,948, dated Dec. 18, 2015, 21 pages.

AU Examination Report for AU Application No. 2010200874, dated Oct. 26, 2010. 2 Pages.

AU Examination Report for AU Application No. 2012207011, dated Novermber 7, 2013. 3 Pages.

* cited by examiner

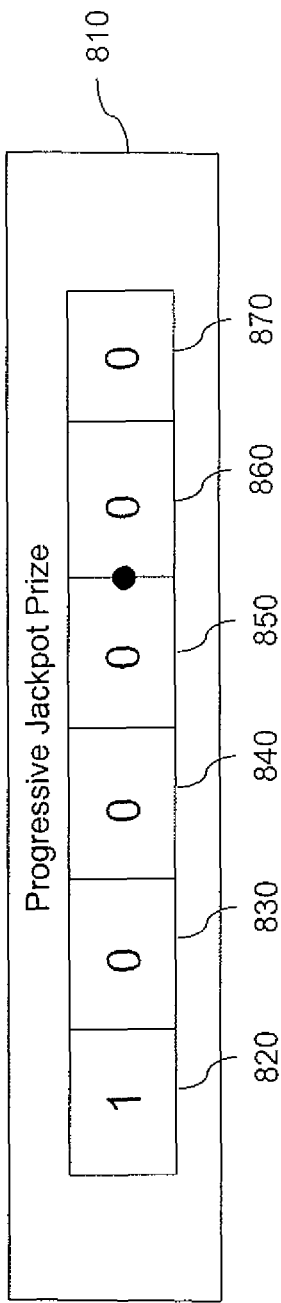
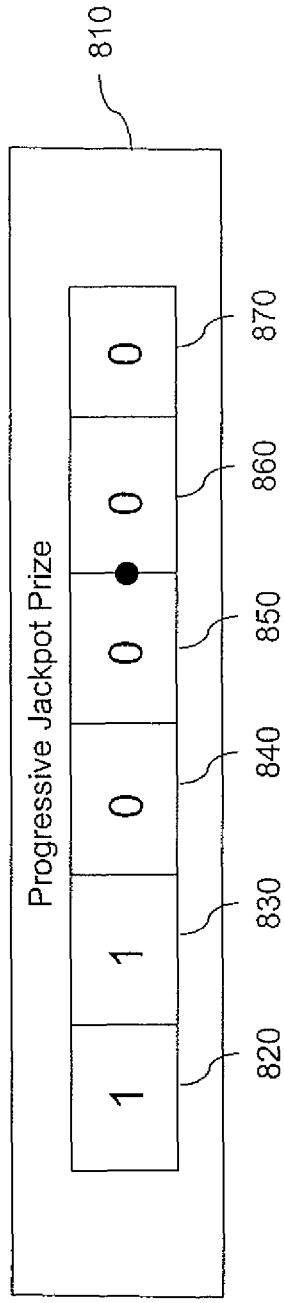
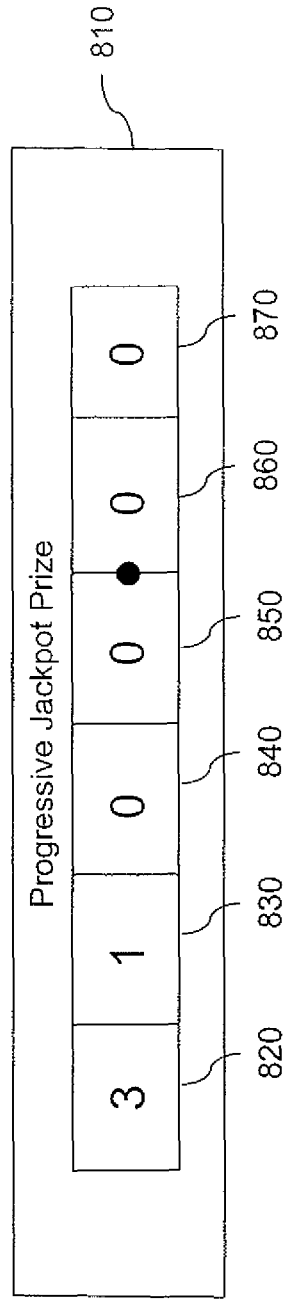
Figure 8a
Figure 8b
Figure 8c

METHOD OF GAMING, A GAME CONTROLLER, AND A GAMING SYSTEM

CROSS-REFERENCE TO RELATED APPLICATIONS

The present application is a continuation of, and claims the benefit of priority from, U.S. patent application Ser. No. 13/798,948, filed on Mar. 13, 2013, entitled "METHOD OF GAMING, A GAME CONTROLLER, AND A GAMING SYSTEM", which is a continuation of, and claims the benefit of priority from, U.S. patent application Ser. No. 12/719,478, filed on Mar. 8, 2010 entitled "METHOD OF GAMING, A GAME CONTROLLER AND A GAMING SYSTEM", and to Australian Patent Application Number 2009901016, filed on Mar. 10, 2009, each of which is hereby incorporated by reference in their entireties for all purposes.

FIELD

The present invention relates to a method of gaming, a game controller and a gaming system.

BACKGROUND

Current electronic gaming machines allow a player to place a wager or bet, in return for which a play of the game provided by the gaming machine is conducted. Many venues offer a progressive jackpot, provided by a plurality of gaming machines participating in the jackpot, to be conducted. Typically, a portion of turnover on each gaming machine is forwarded to a jackpot controller as a contribution. That is, part of each wager goes towards the jackpot. The technique can be extended to a so called wide area jackpot where gaming machines from a number of different venues contribute to a single jackpot pool.

One common way of awarding a jackpot is a so called mystery jackpot where a trigger value, generally in a prize range, is randomly selected and stored by the jackpot controller. The jackpot controller determines to award the jackpot prize when the contributions cause the value of the jackpot pool to reach the trigger value.

A problem with this sort of jackpot is that while such jackpots are generally randomly determined, the range of jackpot prizes can become known and can affect play. For example, play of gaming machines may drop off just after a jackpot is awarded because players perceive the chance of winning a jackpot is diminished shortly after a previous jackpot is awarded. Similarly, play may increase as a progress jackpot reaches a value near a known upper limit.

While such gaming systems provide users with enjoyment, a need exists for alternative gaming systems to minimise or eliminate any period where the player thinks the jackpot will not be won.

SUMMARY

In a first aspect, the invention provides a method of gaming including:
conducting a progressive jackpot including a prize defined by a plurality of digits; and
incrementing the progressive jackpot by incrementing a digit of said plurality of digits of the prize in response to a trigger event corresponding to said digit occurring.

In a second aspect, the invention provides a game controller arranged to:
conduct a progressive jackpot including a prize defined by a plurality of digits; and
increment the progressive jackpot by incrementing a digit of said plurality of digits of the prize in response to a trigger event corresponding to said digit occurring.

In a third aspect, the invention provides a gaming system including:
a display to display a prize of a progressive jackpot to a player, the prize defined by a plurality of digits; and
a game controller arranged to:
conduct the progressive jackpot;
increment the progressive jackpot by incrementing a digit of said plurality of digits of the prize in response to a trigger event corresponding to said digit occurring and
display the incremented digit of the prize to the player.

In a fourth aspect, the invention provides a gaming system including:
at least one gaming device including a cabinet, a display mounted within the cabinet arranged to display a prize of a progressive jackpot to a player, the prize defined by a plurality of digits, and a game play mechanism mounted to the cabinet incorporating at least one input device, the game play mechanism operable by the player to place wagers in the progressive jackpot, and a game controller disposed within the cabinet including a processor and a memory storing game control instructions which enable the game controller to operate, the game controller arranged to:
conduct the progressive jackpot;
increment the progressive jackpot by incrementing a digit of said plurality of digits of the prize in response to a trigger event corresponding to said digit occurring; and
display the incremented digit of the prize to the player.

In a fifth aspect, the invention provides a gaming system including:
means for displaying a prize of a progressive jackpot to a player, the prize defined by a plurality of digits; means for conducting the progressive jackpot;
means for incrementing the progressive jackpot by incrementing a digit of said plurality of digits of the prize in response to a trigger event corresponding to said digit occurring; and means for displaying the incremented digit of the prize to the player.

In a sixth aspect, the invention provides computer program code which when executed implements the above method.

In a seventh aspect, the invention provides a computer readable medium including the above program code.

In an eight aspect, the invention extends to transmitting or receiving the above program code.

In a ninth aspect, the invention provides a data signal including the above program code.

BRIEF DESCRIPTION OF DRAWINGS

Certain exemplary embodiments of the invention will now be described with reference to the accompanying drawings in which:

FIGS. 8*a*-8*c* are illustrations of an exemplary sequence of progressive jackpot prizes.

Figure 1:
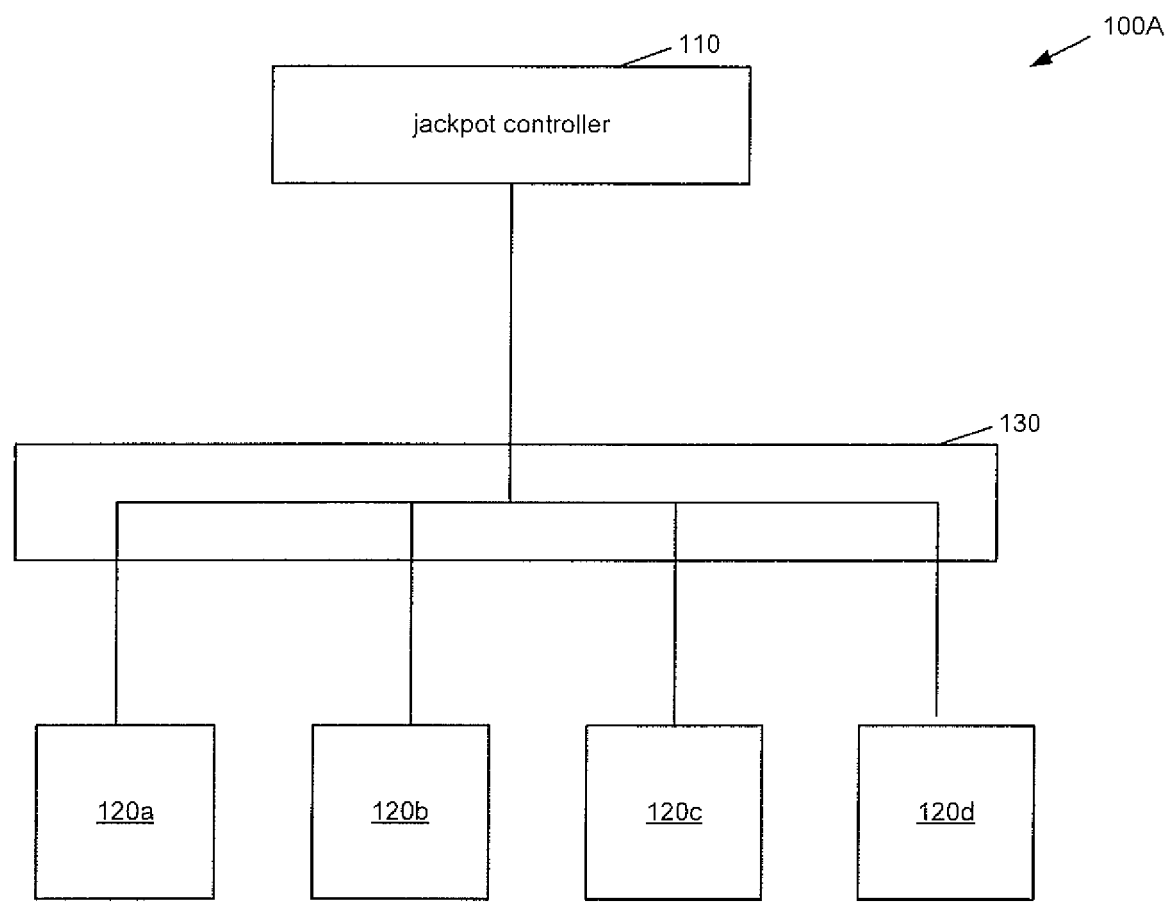
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

Referring to the drawings, there is shown a gaming method and system having a game controller arranged to implement a game including a progressive jackpot having a prize defined by a plurality of digits, where the progressive jackpot is incremented by incrementing a digit of the plurality of digits in response to a trigger event corresponding to the digit.

General Construction of Gaming System

The gaming system can take a number of different forms. In a first form, a stand alone gaming machine is provided wherein all or most components implementing the game are present in a player operable gaming machine.

In a second form, a distributed architecture is provided wherein some of the components implementing the game are present in a player operable gaming machine and some of the components implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
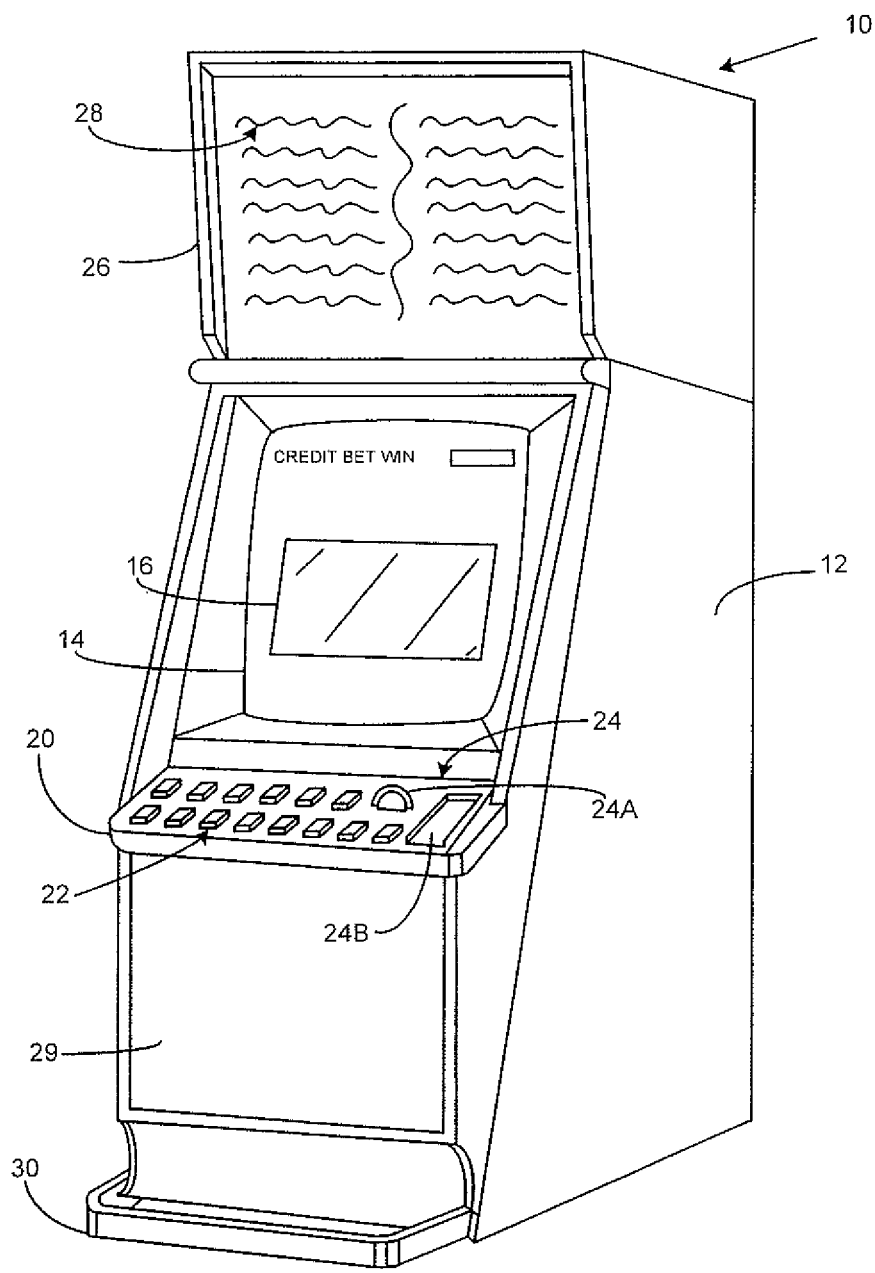
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
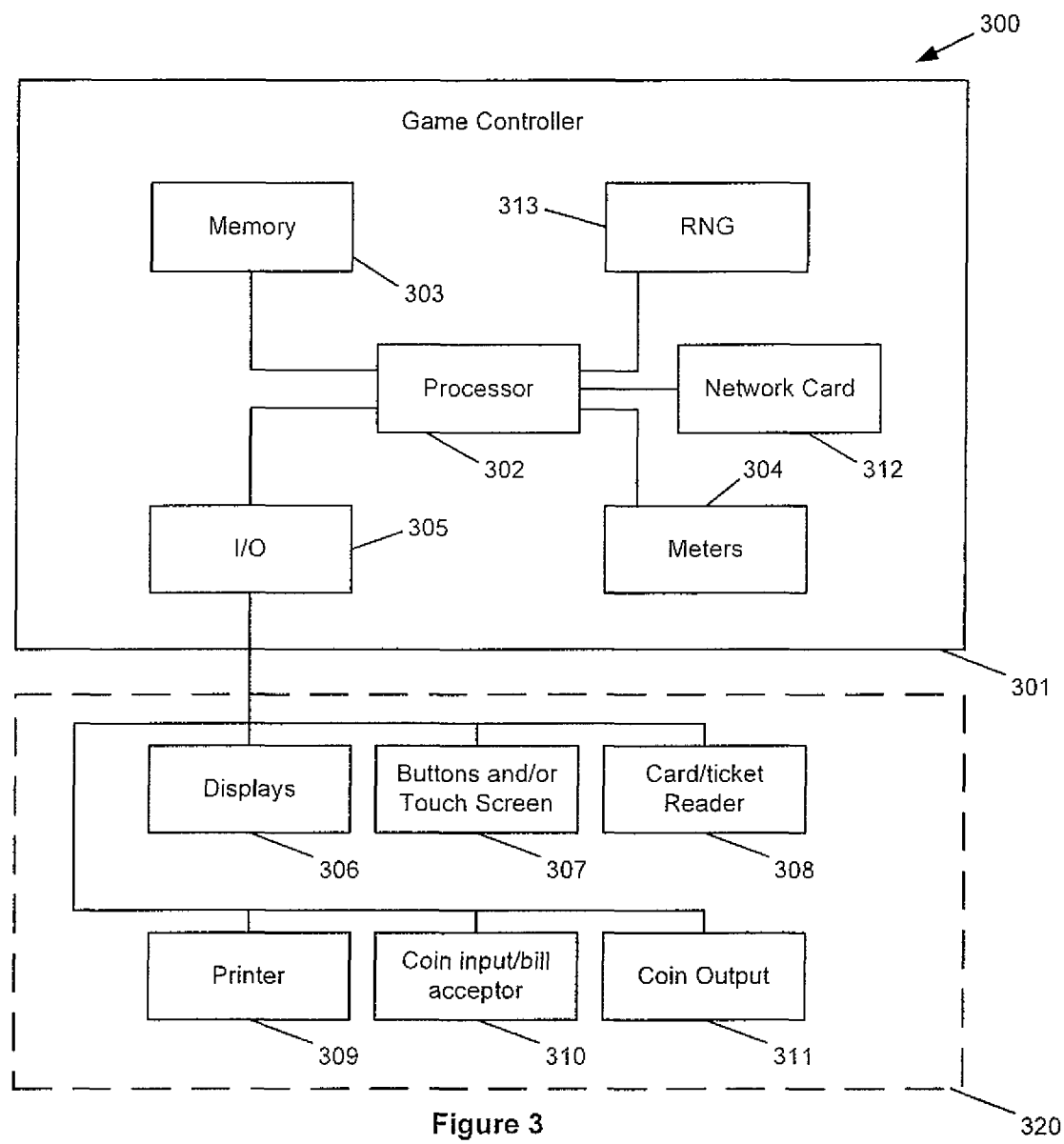
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102.

Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
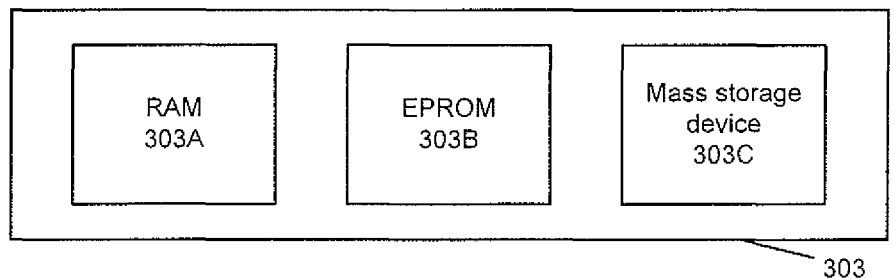
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
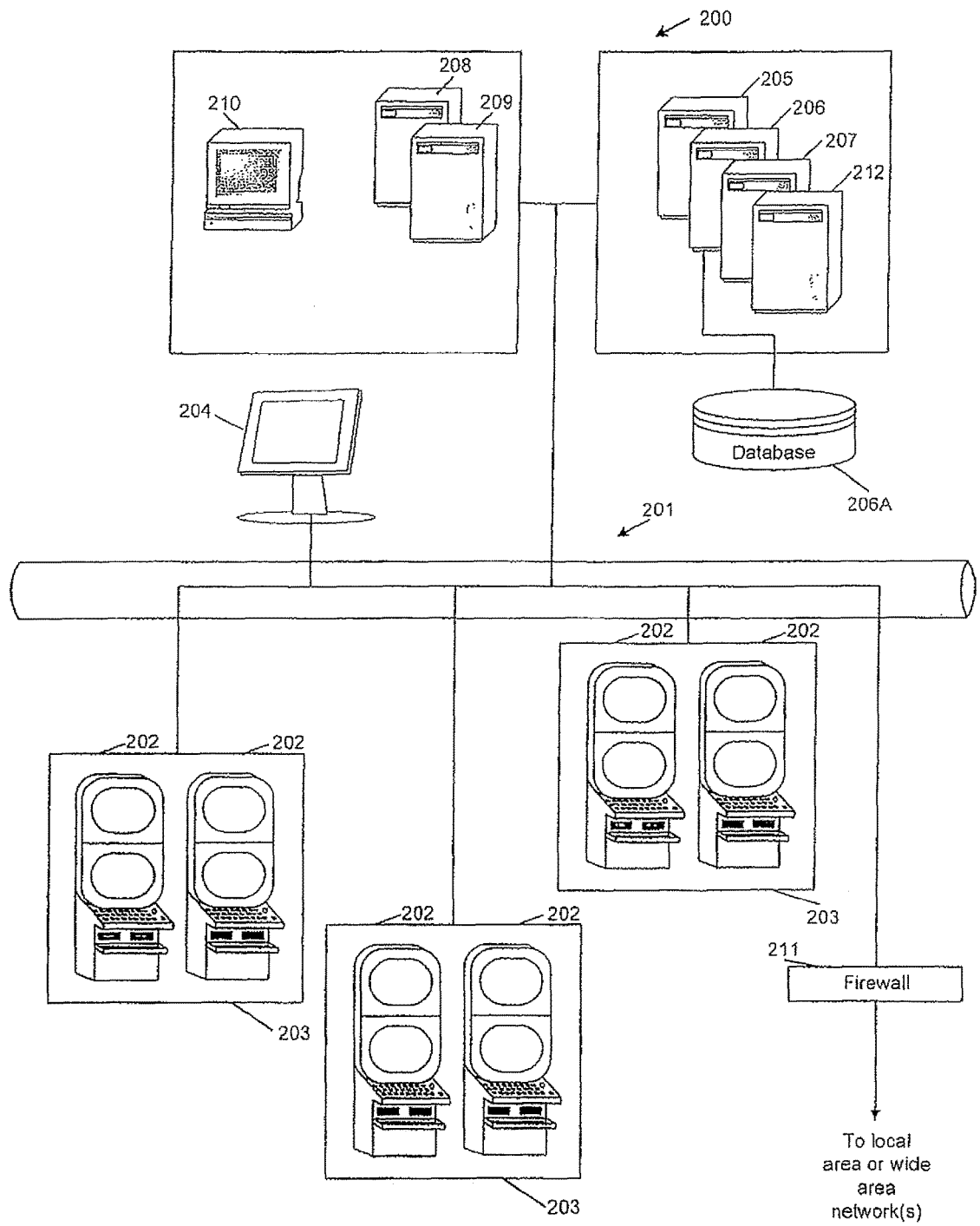
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the rules, guidelines, preferences, and/or requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games based on the terminals.

Further Detail of Gaming System

As individual games are played on the gaming machines 202, data including the contributions of individual games is sent over the network to the Jackpot server 207, which performs the accounting functions for the progressive jackpot game. It will be appreciated that in a progressive jackpot, individual gaming machines may contribute towards a single jackpot or several jackpot pools, the value of which is maintained by the Jackpot server 207. It will also be appreciated that in a progressive jackpot, data representing contributions received from the gaming machines is sent to the Jackpot server 207 and the jackpot pool is incremented according to these contributions. However, it will be further appreciated that the jackpot pool and the jackpot prize available to be won by the player need not be the same value and thus the jackpot prize to be won by the player need not be incremented in relation to the incoming contributions and may be incremented in a different manner.

Furthermore, it will also be appreciated that a jackpot module of the game controller 60 may be used in collaboration with the Jackpot server 207 to perform functions other than accounting, such as determining whether a jackpot prize should be awarded to a player, controlling the value of the contributions made by the gaming machines towards the jackpot pool and incrementing the jackpot prize. For example, the jackpot module may perform the function of determining whether the jackpot prize should increment and, if so, determining the value of which it is to increment.

Figure 6:
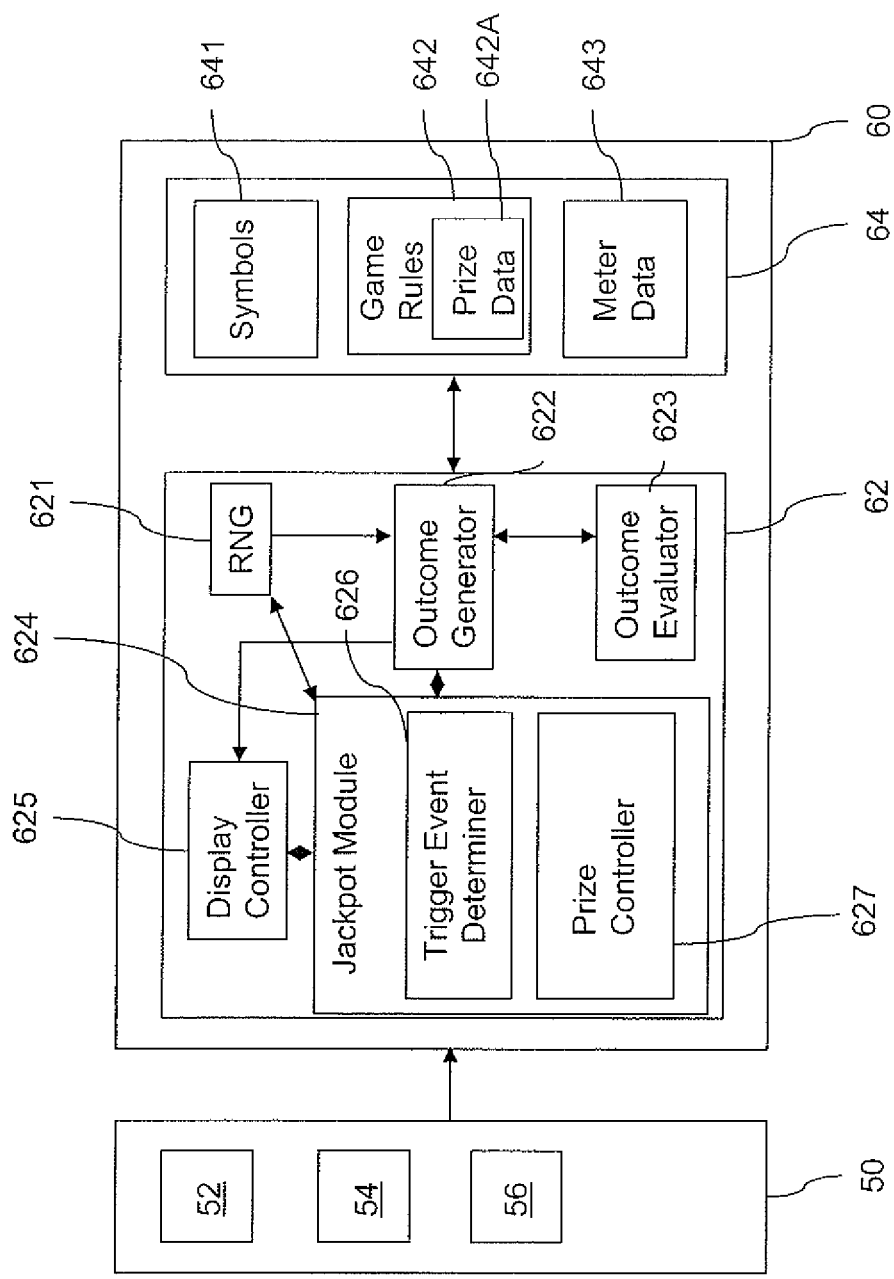
FIG. 6 is a further block diagram of a gaming system.

Referring now to FIG. 6, the player operates game play mechanism 56 to make a selection and input game instructions, selected from a plurality of available instructions, to the game controller 60. As described above, the game play mechanism 56 can be in the form of a touch screen and/or buttons. In an embodiment, the player may qualify to participate in a progressive jackpot by playing a base game. The player may only participate in the progressive jackpot subject to an eligibility criterion such as playing the maximum credits available.

In an alternative embodiment, the player may need to actively make a selection to participate in the progressive jackpot, for example by placing an ante bet. Typically, where a plurality of individual gaming machines contribute to a collective progressive jackpot prize, it is envisaged that the prize may be formed from the contributions of a single machine.

In one example, a game is conducted by the gaming machine with a progressive jackpot and an outcome generator 622 operates in response to the player's operation of game play mechanism 56 to generate a game outcome which will then be evaluated by outcome evaluator 623 and jackpot module 624. In an embodiment, the outcome evaluator 623 evaluates the generated game outcome and the jackpot module 624 evaluates whether the generated game outcome corresponds to an event relating to the progressive jackpot. For example, the generated game outcome may correspond to a trigger event corresponding to the progressive jackpot being incremented in value. Alternatively, the trigger event may be a game event other than a game outcome, such as the number of games played.

In an example, a jackpot trigger event determiner 626 in the jackpot module 624 determines a generated game outcome or other game event corresponds to a trigger event to increment the progressive jackpot. However, it will be appreciated by a person skilled in the art that the determination of a trigger event may be made at the Jackpot server 207, rather than locally at the jackpot module 624, in the case where the gaming machine is connected across a network. In this scenario, data could be sent to the jackpot module 624 indicating that the progressive jackpot has increased or could be displayed on a display 54 controlled by the jackpot module of the game controller 60 and viewable from the gaming machine. Also, an indication to make an award, or that award has been made, of the progressive jackpot would be sent to the gaming machine played by the player.

In one embodiment, the outcome generator 622 forms the game outcome by employing random number generator 621 to randomly select symbols from a set of symbols specified by symbol data 641. The selected symbols are advised to the display controller 625 which causes them to be displayed on display 54 at a set of display positions. In one example, outcome generator 622 selects symbols for display from a plurality of symbol sets corresponding to respective ones of a plurality of spinning reels. Thus, the symbol sets 641 specify a sequence of symbols for each reel such that the outcome generator 622 can, in one example, select symbols for display by selecting a stopping position in the sequence. In one example, three symbols of each of five reels may be displayed such that symbols are displayed at fifteen display positions on display 54. In addition, the progressive jackpot may be a prize defined by a plurality of digits, which is displayed to the player on the display 54 by the display controller 625. For example, the prize is a six digit prize having a maximum value of $9999.99.

In one embodiment, the outcome evaluator 623 evaluates the game outcome generated by the outcome generator 622, displayed as symbols arranged at a set of display positions, to determine if the outcome corresponds to a winning combination specified in the prize data 642A based on game rules 642. For example, the game rules may specify that all combinations are evaluated left to right or can be evaluated right to left or both. Also, to obtain a desired return to player, a probability table having weighted outcomes may be stored in the game rules 642 and employed when selecting the symbols. In addition to these game rules, further rules for incrementing the progressive jackpot prize may be stored in the memory 64. For example, designated game outcomes may be stored in the game rules 642 as the corresponding combination of symbols to be determined by a jackpot trigger event determiner 626 of the jackpot module 624 as the event to trigger the prize displayed to the player be incremented.

An example of a designated game outcome may be the occurrence of three king symbols in a row. The occurrence of three kings may correspond to a particular value of a digit, e.g. $1000.00 (i.e. the "thousands" digit) to increment the jackpot prize. The jackpot trigger event determiner 626 may also make additional determinations of game outcomes known in the art. For example "scatters" (scattered symbols) may be determined as a trigger event irrespective of whether they are on a played arrangement of symbol positions.

In another example, the probabilities of jackpot trigger events, such as designated game outcomes or scattered symbols, can be assigned using the random number generator 621. This can be arranged by the random number generator 621 generating a random number between 1 and a designated number so that the outcome generator 622 generates a game outcome corresponding to a trigger event when the generated number is a 1 and the trigger event determiner 626 determines the outcome as a trigger event. Alternatively, the jackpot module 624 is in communication with the random number generator 621 and upon receipt of a generated random number equaling 1, the trigger event determiner 626 determines that a corresponding trigger event occurs without analysing the game outcome. Persons skilled in the art will appreciate that the random number generator 621 generates numbers in a defined range (e.g. 0 to 1) and that these can be mapped to the desired number range.

It will also be appreciated that the trigger event to increment the jackpot prize may be based on an average number of games played rather than any specified game outcome. In this case, the probability of incrementing the progressive jackpot is assigned by allocating a number of games to be conducted before the trigger event occurs which can also be implemented using the random number generator 621. For example, the number of games to be conducted before a trigger event occurs is assigned an average number and a random number generator 621 generates a random number between 1 and the assigned number for each conducted game, or conducted game round within a game, so that the conducted game corresponding to a trigger event occurs when the random number equals 1. In this example, the assigned number of games to be conducted may be stored in the game rules 642 in a table and the jackpot trigger event determiner 626 of the jackpot module 624 determines a trigger event occurs when it receives, or determines, a generated random number of 1 from the random number generator 621. Table 1 below shows an example of probabilities of incrementing each digit of the prize based on the allocated number of games being the upper limit of the defined range of random numbers generated, i.e. the random number generator 621 generates a random number between 1 and the allocated number of games and a trigger event to increment a digit occurs when the generated random number equals 1.

TABLE 1

| Digit  | Number of | Games Probability |
|--------|-----------|-------------------|
| $0001  | 10        | 0.10              |
| $0010  | 20        | 0.05              |
| $0100  | 50        | 0.02              |
| $1000  | 100       | 0.01              |

It will also be appreciated that, in addition to the trigger event being a designated outcome or being based on the number of games, a random game event, such as a random symbol occurrence or another random event such a random number of coins being fed into the gaming machine, could correspond to a trigger event. It is envisaged that the random number generator 621 could be employed to generate the random game event.

In another embodiment, jackpot module 624 includes a prize controller 627 to control incrementing the progressive jackpot by incrementing a digit of the plurality of digits of the prize. That is, the prize controller 627 controls incrementing each digit of the prize independently, in response to a trigger event corresponding to the digit occurring. For example, the prize controller 627 increments a digit of the prize according to the trigger event determiner 626 determining that a game outcome, other event, or received indication, corresponds to a trigger event to increment that digit.

It will be appreciated by a person skilled in the art that varying probabilities of trigger events occurring may be employed corresponding to the different digits being incremented. One way of implementing the varying probabilities is in a table of probability of occurrence of trigger events corresponding to each digit of the prize. The table of probabilities may also be a table of possible game outcomes corresponding to incrementing each digit of the prize and the tables could be stored in the game rules 642.

The trigger event determiner 626 determines for each digit in a progressive jackpot whether a trigger event corresponding to any digit has occurred and if so the prize controller 627 controls incrementing the corresponding digit(s) accordingly. Alternatively, the jackpot module 624 may receive instructions remotely that a trigger event has occurred and that a digit of the prize has been incremented accordingly.

In the embodiment where the jackpot prize is a 6 digit number, with 2 numbers after the decimal point, i.e. $1234.56, the prize controller 627 controls incrementing each of the six digits simultaneously, i.e. in each progressive jackpot game. In addition, each of the six digits may have a corresponding trigger event corresponding to an increment trigger for the digit. In one example, the random number generator 621 can be used by the jackpot module 626 to generate six individual game events, or outcomes, simultaneously in a progressive jackpot, so that the trigger event determiner 626 determines on six occasions whether a corresponding trigger event occurs. In this case, more than one digit can be incremented in a progressive jackpot. In another example, the random number generator is employed to generate one trigger event in a progressive jackpot and the trigger event determiner 626 determines if the result corresponds with a trigger event for any of the digits.

The prize controller 627 may also control the number of increment units to increment each digit of the prize. For example, the trigger event determiner 626 may determine a game outcome corresponds to a trigger event to increment a digit and the prize controller controls, based on a table of assigned increment units for game outcomes, the number of units to increment that digit of the prize. A person skilled in the art would understand that the table of assigned increment units and corresponding game outcomes may be stored in the game rules 642.

By way of an example, the random number generator 621 is used to assign the probabilities of trigger events corresponding to each digit occurring by generating a random number between 1 and a designated number. In this example, the designated number is 100, and the probability of that trigger event occurring is 0.01. As would be appreciated, this method enables the probability to be easily varied for one or each digit or for the number of increment units applied to each digit. In another example, the probability of increasing the most significant digit of the jackpot prize may be 0.01 during normal games but after the occurrence of a game event such as the prize reaching a designated value, the probability of increasing the most significant digit may be decreased to 0.001. Other examples of game events include a jackpot award being made to the player and a jackpot reset event. However, it will be appreciated that this list is not exhaustive and in addition to other game events being used, game outcomes, such as the occurrence of symbols, may be used to vary the assigned probabilities.

In another embodiment, a table of probabilities is employed where each digit of the prize is randomly assigned a probability of being incremented when a corresponding trigger event occurs from a table of probabilities (e.g. for six digits the probabilities are: 0.1, 0.01, 0.01, 0.001, 0.005, 0.05). In this example, the probability of the most significant digit incrementing may be randomly assigned a probability of 0.1 in one game and in a subsequent game, or after the digit is incremented, the probability of the most significant digit incrementing may be randomly assigned a probability of 0.05.

Further to this embodiment, each digit may be assigned a pathway of probabilities to be incremented from a table of probabilities corresponding to the number of increment units for each digit. For example:

TABLE 2

| Most Significant Digit Increment Units | Probability to increment |
|----------------------------------------|--------------------------|
| $1000                                  | 0.1                      |
| $2000                                  | 0.2                      |
| $3000                                  | 0.001                    |
| $4000                                  | 0.01                     |

It is envisaged that such the pathway of probabilities to increment a digit can be reassigned when a game event occurs, such as when the progressive jackpot is won or reset, when the jackpot prize is within a certain range of values, or after a certain number of games. For example (in the event where the jackpot prize is now above $5000):

TABLE 3

| Most Significant Digit Increment Units | Probability to increment |
|---|---|
| $1000 | 0.05 |
| $2000 | 0.01 |
| $3000 | 0.001 |
| $4000 | 0.001 |

Alternatively, the pathway of probabilities to increment the digit can be reassigned on the occurrence of a random game event, such as a random value of coins into the gaming machine or a random symbol occurrence. Furthermore, random game events could be assigned as trigger events to increment a digit of the prize by a number of increment units.

Figure 7:
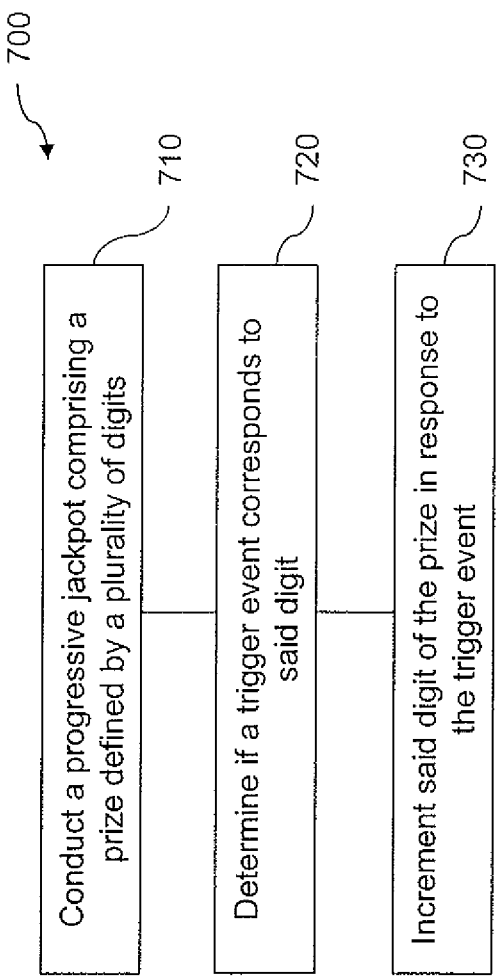
FIG. 7 is a flow chart of an embodiment.

A method 700 of gaming is summarised in FIG. 7 and involves conducting 710 a progressive jackpot including a prize defined by a plurality of digits, determining 720 if a trigger event corresponds to said digit and incrementing 730 the digit of the prize in response to the determined trigger event.

For example, when conducting a progressive jackpot, each digit of the prize can be incremented independently in response to corresponding trigger events occurring in a progressive jackpot game. In this example, the method 700 of gaming enables the appearance of random increases in the prize to the player to provide the perception that the prize may increase substantially during play if the most significant digit is increased.

In the above example, to ensure that the step of incrementing a digit of the prize conforms to game rules of providing a minimum pay out over time, or other equivalent rules, the method of gaming further includes assigning the probability of trigger events corresponding to each digit occurring. Also, to further ensure conformance to the game rules, the method further includes assigning a number of increment units to varying the increment of each digit of the prize when a corresponding trigger event occurs. However, as described above, it is possible that the assigned probability of a trigger event occurring varies when a particular game event occurs, such as a jackpot award or reset event.

By way of example of a sample game 800, incrementing the progressive jackpot and displaying the progressive jackpot prize 810 to a player is shown in FIGS. 8a-8c. In the sample game, the progressive jackpot is a six digit prize with a maximum value of $9999.99. However, it is envisaged that the prize may have more or less digits. Each digit is displayed to the player in a sequence of digit displays 820, 830, 840, 850, 860 and 870, corresponding to decimal positions of the prize, and each digit display can be updated independently.

In the sample game, at FIG. 8a, the progressive jackpot has a total of $1000.00 and is incremented to $1100.00 in response to a trigger event occurring in the game corresponding to the second most significant digit. Consequently, display 830 is updated to display the numeral '1' instead of '0' to the player in FIG. 8b.

In this example, the second most significant digit is incremented by a single unit. It is envisaged that a number of increment units (from 1-9) can be assigned to increment the digit in response to a trigger event. It also envisaged that the probabilities for each digit being incremented by different numbers of units can be assigned to the game rules and may be assigned as a pathway of probabilities table.

In addition, it is envisaged that a trigger event may correspond to more than one digit in the jackpot prize and, in one embodiment, a trigger event may correspond to a trigger to increment more than one digit of the prize by any number of increment units. For example, a game outcome of 4 Aces in a row may correspond to both the most and second most significant digits incrementing by $1000 and $500 respectively. In this example, if the progressive jackpot prize was displayed to the player as $1000 in the display 810, it would be incremented to $2500.

In another example of the sample game, the progressive jackpot prize displayed at FIGS. 8a and 8b has not yet been awarded to a player and is still accumulating in response to trigger events. In FIG. 8c, a trigger event corresponding to the most significant digit being incremented occurs in the sample game and the display 820 shows the most significant digit of the prize being incremented by two units, i.e. from $1000 to $3000. The progressive jackpot will continue to increment according to the game rules until it is awarded to a player in response to a corresponding jackpot award or a reset jackpot event occurs.

Further aspects of the method will be apparent from the above description of the system. It will be appreciated that at least part of the method will be implemented digitally by a processor. Persons skilled in the art will also appreciate that the method of the embodiment could be embodied in program code. The program code could be supplied in a number of ways, for example on a tangible computer readable medium, such as a disc or a memory (for example, that could replace part of memory 103) or as a data signal (for example, by transmitting it from a server). Persons skilled in the art will appreciate that program code provides a series of instructions executable by the processor.

It will be understood to persons skilled in the art of the invention that many modifications may be made without departing from the spirit and scope of the invention, in particular it will be apparent that certain features of the invention can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments and/or aspects without departing from the spirit or scope of the invention as broadly described. For example, it will be apparent that certain features of the invention can be combined to form further embodiments. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A gaming system comprising:
a server maintaining a collective value in its memory;
a plurality of gaming devices in networked communication via a communications network with the server, wherein each gaming device comprises (i) a cabinet, (ii) a display device mounted within the cabinet, (iii) a game play mechanism mounted to the cabinet and including one or more of at least one button and a touch screen display device configured to receive an input and display game content, (iv) a game controller disposed within the cabinet and comprising a processor configured to execute a random number generator (RNG) and a memory storing game control instructions which, when executed by each respective processor, cause each respective processor to:
determine game play instructions from the game control instructions in response to the input by a player at a respective game play mechanism;
determine, based at least in part upon the game play instructions determined in response to the input by the player, that the player is eligible to receive the collective value;
retrieve, from the memory, a table of increment units and associated probabilities;
cause to be displayed on a respective display device, the collective value, the collective value including a plurality of digit displays corresponding to a plurality of digits associated with the collective value;
determine, based at least in part upon the game play instructions determined in response to the input by the player and the determination that the player is eligible to receive the collective value, an occurrence of a trigger event from a plurality of trigger events using a first output from the RNG;
select, in response to determining the occurrence of the trigger event, a digit from the plurality of digits by performing a first lookup in the table to determine which digits of the plurality of digits are associated with the trigger event, each digit of the plurality of digits associated with at least one of the plurality of trigger events;
determine a number of increment units for the trigger event by performing a second lookup in the table stored in the memory using a second output from the RNG; and
transmit data, via the communication network to the server, containing the selected digit and the number of increment units;
wherein the server increments a value of the selected digit based on the determined number of increment units to obtain an updated collective value in response to the receipt of the data.

2. The gaming system of claim 1, wherein the RNG is configured to assign a probability of the trigger event occurring by generating a random number between 1 and a designated number, so that the trigger event occurs when the random number equals 1.

3. The gaming system of claim 1, wherein when executed by each respective processor, the game control instructions cause each respective processor to assign a probability to each trigger event of the plurality of trigger events, wherein each probability represents a likelihood that a corresponding digit associated with a respective triggering event is incremented by a specific number of units.

4. The gaming system of claim 3, wherein when executed by each respective processor, the game control instructions cause each respective processor to assign a fixed probability to each trigger event of the plurality of trigger events.

5. The gaming system of claim 3, wherein when executed by each respective processor, the game control instructions cause each respective processor to assign a probability to each trigger event of the plurality of trigger events from the table.

6. The gaming system of claim 3, wherein the assigned probabilities of each trigger event of the plurality of trigger events vary within the collective value in response to a game event.

7. The gaming system of claim 6, wherein the game event comprises a collective value award event, a collective value reset event or a collective value designated value being reached event.

8. The gaming system of claim 1, wherein the trigger event is associated with an assigned number of increment units, whereby the value of the selected digit is incremented by the assigned number of increment units in response to receiving, by the server from each of the plurality of gaming devices, an indication of the trigger event.

9. The gaming system of claim 8, wherein when executed by each respective processor, the game control instructions cause each respective processor to assign a probability to the trigger event.

10. The gaming system of claim 9, wherein the probabilities of incrementing the value of each digit by the assigned numbers of increment units for each digit varies in response to a game event.

11. The gaming system of claim 8, wherein when executed by each respective processor, the game control instructions cause each respective processor to assign a pathway of probabilities of incrementing each digit by the assigned number of increment units from the table for each digit.

12. The gaming system of claim 8, wherein the server increments the collective value by incrementing the respective value of each of the plurality of digits by the assigned number of increment units in response to the respective associated trigger event occurring for each digit.

13. The gaming system of claim 1, wherein the trigger event comprises a game event.

14. The gaming system of claim 1, wherein the trigger event comprises a game outcome.

15. The gaming system of claim 1, wherein the trigger event comprises a random game event.

* * * * *